Figure 1:
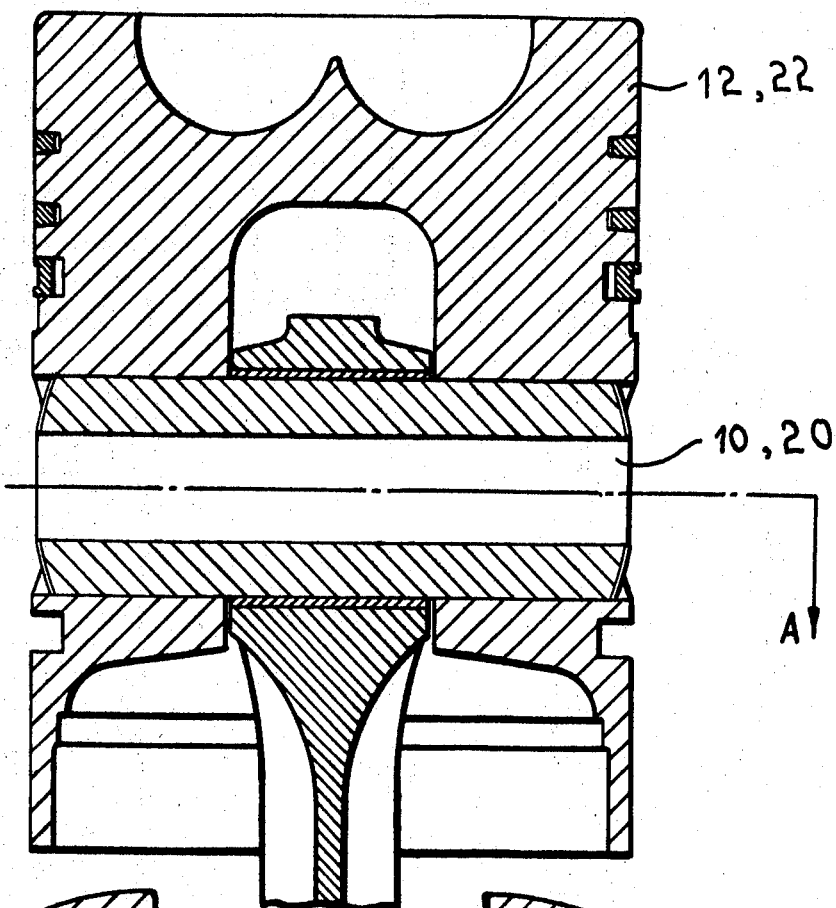

United States Patent

[11] 3,575,089

| [72] | Inventor | James Millar Smith |
| | | Whittle-Le-Woods, Chorley, England |
| [21] | Appl. No. | 798,077 |
| [22] | Filed | Feb. 10, 1969 |
| [45] | Patented | Apr. 13, 1971 |
| [73] | Assignee | Leyland Motors Limited |
| | | Leyland, Preston, Lancashire, England |

[54] GUDGEON PIN CONNECTION FOR INTERNAL COMBUSTION ENGINE
3 Claims, 3 Drawing Figs.
[52] U.S. Cl. ................................................ 92/187, 29/156.5
[51] Int. Cl. ................................................ F16j 1/14, B23p 15/10
[50] Field of Search .......................................... 92/187; 29/156.5

[56] References Cited
UNITED STATES PATENTS

| 1,157,130 | 10/1915 | Stebbins | 92/187 |
| 1,435,528 | 11/1922 | Keilholtz | 92/187 |
| 1,438,132 | 12/1922 | Nelson | 92/187 |
| 1,601,918 | 10/1926 | Knight | 92/187X |
| 2,408,875 | 10/1946 | Parkins | 92/187X |

Primary Examiner—Martin P. Schwadron
Assistant Examiner—Robert R. Sunevich
Attorney—Watson, Cole, Grindle & Watson ABSTRACT: The specification describes the making of a gudgeon pin connection in the construction of internal combustion engine, the connection being characterized by the facing of the ends of the pin, which forms the connection between the small end of a connecting rod and piston of the engine, with material different of that of the pin itself deposited in layers of appropriate thickness.

Patented April 13, 1971 3,575,089

Inventor
James M. Smith
By
Watson, Cole, Grindle + Watson
Attys.

GUDGEON PIN CONNECTION FOR INTERNAL COMBUSTION ENGINE

The invention relates to the construction of internal combustion engines and is concerned with the gudgeon pin connection between the small end of the connecting rod and the piston of such an engine.

Gudgeon pins are usually secured against end movement by spring circlips, and some bearing length has to be sacrificed in order to accommodate the clips, either in grooves in the piston bosses, or on the pin ends. In another construction end movement is restrained by gudgeon pin end plugs, push fitted in the outer ends of the pin bores. These plugs, of some such suitable material as phosphor bronze or aluminum which will not damage the cylinder, have end faces shaped to ride on the cylinder wall without affecting the freedom of the pin to rotate. The construction is generally unsatisfactory.

In a gudgeon pin connection in accordance with the invention the pin is of the maximum permissible length and is faced on each end for contact with the cylinder wall and to allow free rotation. The ends of the pin are faced with material different from that of the pin itself, deposited in layers of appropriate thickness. It is thus possible to attain low friction between the pin and the cylinder wall without affecting the hardness and rigidity of the gudgeon pin and without losing the benefit of the maximum bearing length possible with a given pin and piston.

Suitable facing materials include aluminum bronze which may be deposited on alloy steel pins by flame gun or by plasma gun during manufacture.

The invention is applicable both to centrally located and offset gudgeon pin constructions.

Figure 2:
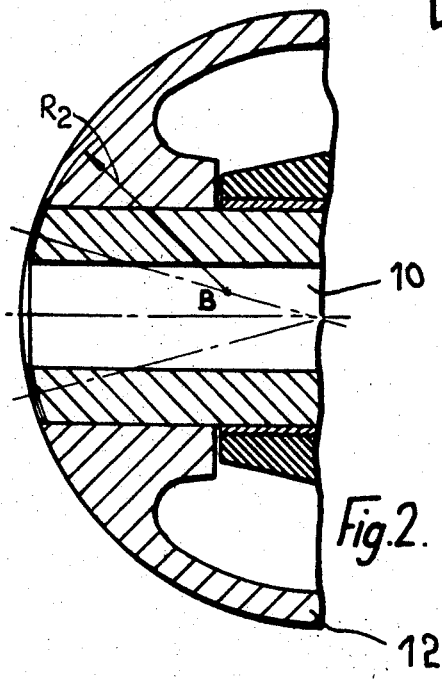
Figure 3:
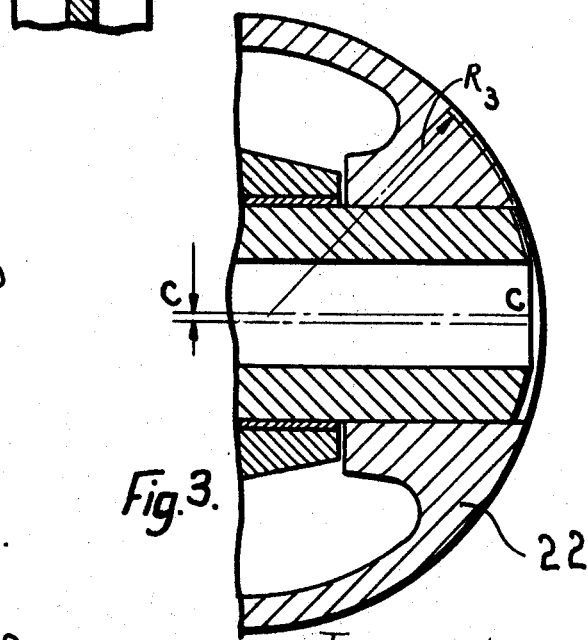

In order that the invention may be better understood the construction of a connection with a central gudgeon pin and of a connection with an offset pin are shown, by way of example, in the accompanying drawing, in which:

FIG. 1 is a vertical section, common to both constructions; and FIGS. 2 and 3 are cross sections on the line A-A of FIG. 1 showing respectively the central and offset pin locations.

In both constructions the end faces of the pins 10 and 20 are machined to a radius ($R_3$ in FIG. 3) a little less than that of the pistons 12 and 22 respectively about horizontal axes A-A normal to the pin axis. In the case of an offset pin location (FIG. 3) the end faces are spherically machined about centers on the pin axis C-C to a radius $R_3$.

For central pin location (FIG. 2) the end faces are machined to somewhat shorter radii $R_2$ about vertical axes B displaced from the axis of the pin.

Bearing surface material may be applied on the gudgeon pin ends by any suitable method. Thus, any of the commercially used methods of metal deposition by means of flame-gun or by plasma-gun, or by electroplating, may be employed with or without the application of an intermediate bonding layer of different material. In practice it is considered that a bearing layer thickness of about 0.030 inch will be the maximum that is likely to be required, regardless of the size of the gudgeon pin, thus simplifying finished machining requirements.

I claim:

1. In an internal combustion engine having a piston and a connecting rod connected to said piston, a gudgeon pin connection between the small end of the said connecting rod and the piston comprising a gudgeon pin of the maximum permissible length and fixed on each end for contact with the wall of the cylinder, the ends of the pin being faced with material, different from that of the pin itself, deposited over and metallically bonded to the end faces in layers of approximate thickness to act as bearing surfaces.

2. In an internal combustion engine according to claim 1, in which the ends of the pin are faced with aluminum bronze.

3. In an internal combustion engine according to claim 1, in which the end faces of the said pin are machined to a radius a little less than that of the piston about axes normal to the pin axis.